United States Patent
Lee et al.

(10) Patent No.: US 9,496,004 B2
(45) Date of Patent: *Nov. 15, 2016

(54) METHOD AND APPARATUS FOR DIVIDING AND DISPLAYING CONTENTS

(71) Applicant: Samsung Electronics Co., Ltd., Gyeonggi-do (KR)

(72) Inventors: Eunhye Lee, Seoul (KR); Jinyoung Jeon, Seoul (KR); Minkoo Kang, Seoul (KR); Jinyong Kim, Seoul (KR); Jihyun Ahn, Seoul (KR); Changmo Yang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 145 days.

This patent is subject to a terminal disclaimer.

(21) Appl. No.: 14/454,895

(22) Filed: Aug. 8, 2014

(65) Prior Publication Data

US 2014/0348487 A1 Nov. 27, 2014

Related U.S. Application Data

(63) Continuation of application No. 13/689,057, filed on Nov. 29, 2012, now Pat. No. 8,818,166.

(30) Foreign Application Priority Data

Dec. 1, 2011 (KR) .................. 10-2011-0127699

(51) Int. Cl.
*H04N 9/80* (2006.01)
*G11B 27/30* (2006.01)
*H04N 5/783* (2006.01)
*H04N 21/431* (2011.01)
*H04N 21/472* (2011.01)
*G11B 27/00* (2006.01)

(52) U.S. Cl.
CPC ........ *G11B 27/3081* (2013.01); *G11B 27/005* (2013.01); *H04N 5/783* (2013.01); *H04N 9/80* (2013.01); *H04N 21/4316* (2013.01); *H04N 21/47217* (2013.01)

(58) Field of Classification Search
CPC .... H04N 9/80; H04N 5/783; H04N 21/4316; H04N 21/47217; G11B 27/005; G11B 27/3081
USPC ................ 386/241, 248, 278, 281, 351, 353
See application file for complete search history.

(56) References Cited

U.S. PATENT DOCUMENTS 5,596,419 A * 1/1997 Yoshimura ........... G11B 27/026
360/32
2009/0079872 A1 3/2009 Seong et al.

FOREIGN PATENT DOCUMENTS

JP 2006-279267 A 10/2006
KR 10-2007-0025335 A 3/2007

* cited by examiner

*Primary Examiner* — Robert Chevalier
(74) *Attorney, Agent, or Firm* — Cha & Reiter, LLC

(57) ABSTRACT

A method for dividing and displaying a content unit includes: extracting a sub-content unit which is generated by dividing an original content unit by a preset time interval; displaying the entire sub-content unit when receiving a sub-content unit display command; receiving a jump command that selects a replay time point for an arbitrary sub-content unit among the above sub-content units; and replaying and displaying the original content unit from the replay time point.

14 Claims, 12 Drawing Sheets

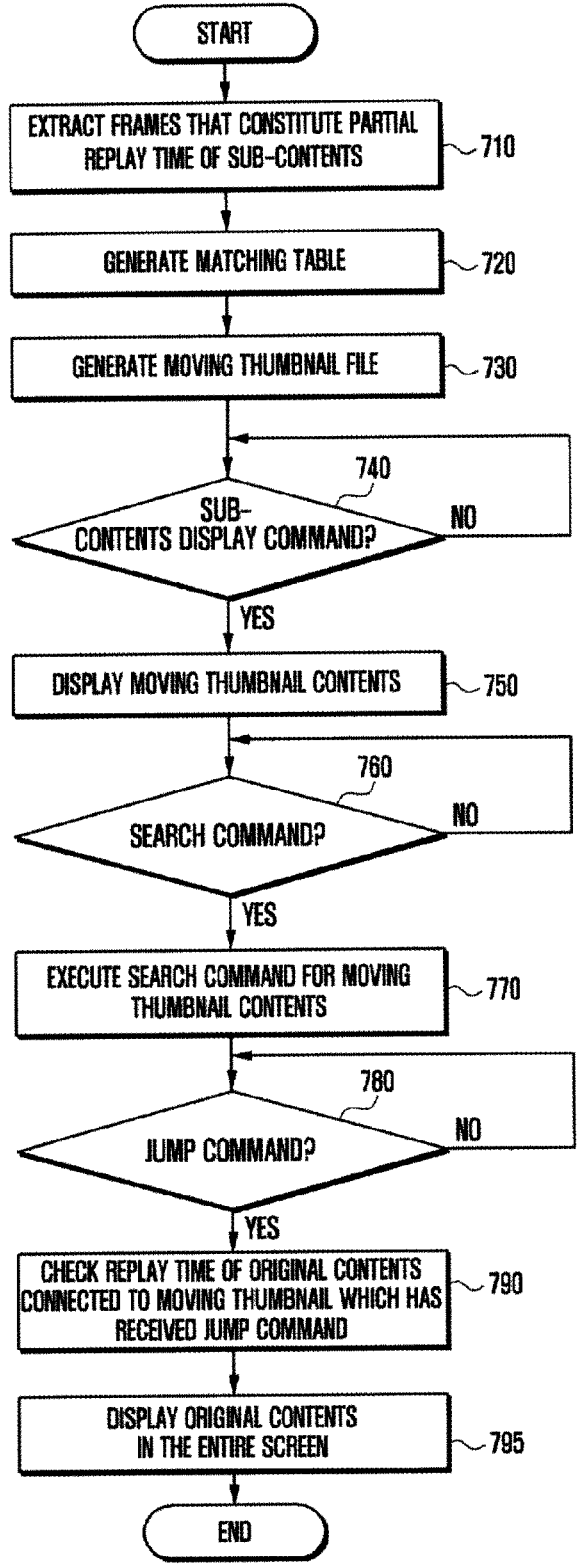

METHOD AND APPARATUS FOR DIVIDING AND DISPLAYING CONTENTS

CROSS REFERENCE TO RELATED APPLICATIONS

The present application is a Continuation of U.S. patent application Ser. No. 13/689,057 filed on Nov. 29, 2012 which claims the benefit under 35 U.S.C. §119(a) of a Korean patent application filed on Dec. 1, 2011 in the Korean Intellectual Property Office and assigned Serial No. 10-2011-0127699, the entire disclosure of which is hereby incorporated by reference.

BACKGROUND

Field of the Invention

The present invention relates to a method and apparatus for dividing and displaying content, and more particularly, to a method for intuitively searching for content and moving to a desired scene, and an apparatus for supporting the same.

Description of the Related Art

Certain prior art user interfaces for replaying moving pictures require a user to search the entire replay time so as to move to a certain time point. That is, a user, who desired to search for a certain scene, used a method of replaying the entire contents using functions such as Rewinding, Fast forwarding, Playing and Pause.

However, according to the above method, when the replay time is long, searching and movement to a certain scene is not easy.

SUMMARY

The present invention has been made in view of the above problems and provides additional advantages, by providing an interface which can easily search for contents and move to a desired scene by simultaneously displaying a plurality of sub-content which have been generated by dividing the original content units by time intervals.

Another object of the present invention is to provide a method and apparatus for simultaneously searching for a multiple of sub-content units by only an intuitive operation.

In accordance with an aspect of the present invention, a method for dividing and displaying a content unit includes: extracting a sub-content unit which is generated by dividing an original content unit by a preset time interval; displaying the entire sub-content unit when receiving a sub-content unit display command; receiving a jump command that selects a replay time point for an arbitrary sub-content unit among the above sub-content units; and replaying and displaying the original content unit from the replay time point.

In accordance with another aspect of the present invention, an apparatus for dividing and displaying a content unit includes: an input unit that receives a user's input; a display unit; and a controller that extracts sub-content units by dividing the original content units by a preset time interval, to display the entire sub-content units at the same time if a sub-content units display command is receive, and to replay and display original content units from the replay time point if a jump command to select the replay time point for the sub-content units is received.

BRIEF DESCRIPTION OF THE DRAWINGS

The above features and advantages of the present invention will be more apparent from the following detailed description in conjunction with the accompanying drawings, in which:

FIG. 10 is a flowchart illustrating a process of extracting a moving thumbnail that represents sub-content units, and executing a search command and a jump command according to another exemplary embodiment of the present invention.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In the present specification, a content unit refers to a content unit which can be replayed in a digital or analog method, and is a concept that includes moving pictures and a sound source having play time. Further, in the present specification, a sub-content unit is a content unit which is generated by dividing the entire play time of the original content unit by time intervals, and can form a separate file. A multiple of sub-content units such as first, second and third content units are extracted from one original content unit.

Further, in the present specification, a moving thumb nail is an extracted frame that constitutes a partial play time of each sub-content unit generated by division of one original content unit, and can represent the sub-content unit.

Figure 1:
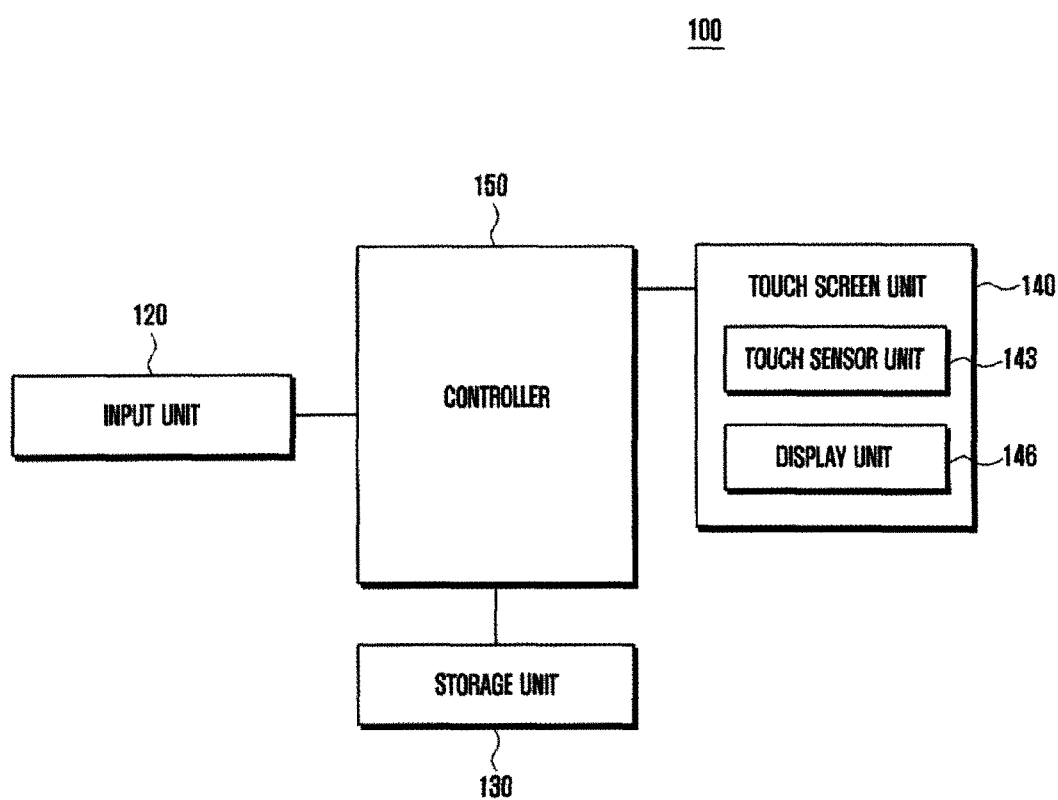
FIG. 1 is a block diagram illustrating an internal structure of an apparatus for dividing and displaying content units according to an exemplary embodiment of the present invention.

FIG. 1 is a block diagram illustrating an internal structure of an apparatus 100 for dividing and displaying content units according to an exemplary embodiment of the present invention.

As illustrated in FIG. 1, an apparatus 100 for dividing and displaying content units according to an exemplary embodiment of the present invention may include an input unit 120, a storage unit 130, a touch screen unit 140 and a controller 150.

The input unit 120 receives user's input for controlling the contents-displaying apparatus 100, generates an input signal, and transmits the generated signal to the controller 150. The input unit 120 may comprise a keypad including a number key and a direction key, and may be formed by a preset function key at one side of the contents-displaying apparatus 100. In an exemplary embodiment of the present invention, the contents-displaying apparatus 100 can be operated using only the touch screen unit 140. In such a case, the touch-sensing unit 143 can perform the function of the input unit 120.

The storage unit 130 stores a program and data which are necessary for operating the contents-displaying apparatus 100, and can be divided into a program area and a data area. The program area can store a program for controlling general operation of the contents-displaying apparatus 100, an application program for replaying multimedia content units, and an application program for replaying sound, displaying an image or replaying a moving picture, etc. Further, the data area is an area where data generated according to a use of a contents-displaying apparatus 100 is stored, and can store various multimedia content units.

The touch screen unit 140 includes a touch-sensing unit 143 and a display unit 146. The touch-sensing unit 131 senses user's touch input. The touch-sensing unit 131 comprises a touch sensor using a capacitive overlay method, a resistive overlay method, and an infrared beam method, etc., but may also comprise a pressure sensor. In addition to the above sensors, other types of sensors known to artisans and capable of sensing a touch or pressure of an object can be implemented as the touch-sensing unit 143 of the present invention. The touch-sensing unit 143 senses user's touch input, generates a sensing signal, and transmits the generated signal to the controller 150. The sensing signal includes data of coordinates inputted by user's touch. In case user inputs a touch position movement operation, the touch-sensing unit 143 generates a sensing signal including the touch position movement path and coordinates data, and transmits the generated signal to the controller 160.

In particular, the touch-sensing unit 143 can sense a command for displaying sub-content units, a jump command for selecting a replay time point, a search command for rewinding, fast-forwarding, playing or pausing the sub-content units.

The display unit 146 can be formed as a liquid crystal display (LCD), an organic light emitting diode (OLED), and an active matrix organic light emitting diode (AMOLED), etc., and visibly provides the menu of a contents-displaying apparatus 100, inputted data, function-setting information and other various sets of information to user. In an exemplary embodiment of the present invention, the display unit 146 performs particularly a function of displaying content units.

The controller 150 controls overall operation for each component of the contents-displaying apparatus 100. In particular, in the contents-displaying apparatus 100 according to the exemplary embodiment of the present invention, the controller 150 can control a process of extracting sub-content units from the original content units, displaying sub-content units, and in response to receiving a jump command, replaying and displaying the original content units from a certain replay time point.

The controller 150 divides the original content units by a preset time interval, and extracts sub-content units. For example, in case the entire replay time of the original content units is 60 minutes, the controller 150 can extract 6 sub-content units by dividing the entire replay time of the original content units by 10 minutes.

In an exemplary embodiment of the present invention, the controller 150 can receive an input of the number of sub-content units to be extracted from one original content units from user and then set the number. In the example above, if the replay time of the original content units is 60 minutes and user inputs the number of sub-content units extracted as 3, the controller 150 can extract 3 sub-content units by dividing the replay time of the original content units by 20 minutes.

The controller 150 checks whether a user input received by the input unit 120 is a sub-content units display command, and displays the entire extracted sub-content units if the input is a sub-content units display command.

For example, the controller 150 can set or recognize a touch input continued for a certain period of time while replaying the original content units on the screen as a content units display command. If such a user input is received, the controller 150 controls the display unit 146 to convert the original content units replay screen into a screen that displays a number of sub-content units. A specific example of displaying such sub-content units will be described later in details with reference to the drawings.

Further, the controller 150 checks whether the user input received by the input unit 120 is a sub-content units search command, and if the input is a search command, the controller 150 displays a search command execution screen of the sub-content units. The search command is for rewinding, fast-forwarding, playing and pausing sub-content units.

In an exemplary embodiment of the present invention, the controller 150 can preset the number of sub-content units which can be displayed as a replay mode so as to efficiently use resources of the contents-displaying apparatus 100.

For example, the controller 150 may preset the number of sub-content units which can be displayed as a replay mode as three, for example. At this time, after user gives a replay command for three sub-content units, if a replay command is given for another sub-content units, the controller 150 converts the sub-content units selected first by user into a stop mode, and display the sub-content units selected second, third and fourth as a replay mode. A specific example of displaying a screen for executing a search command of sub-content units will be described later in details with reference to the drawings.

In an exemplary embodiment of the present invention, the controller 150 checks whether a user input received by the input unit 120 is a jump command that selects a replay time point, and if the input is a jump command, the controller 150 converts the screen so as to display the original content units from the selected replay time point.

For example, the controller 150 can set a touch input continued for a certain period of time for sub-content units to a jump command. If such a user input is received, the controller 150 converts the sub-content units display screen to the original content units display screen, and controls the display unit 146 to display the original content units from the time point of receiving the jump command as a replay mode.

Further, the controller 150 can generate a separate moving thumb nail file which represents a compilation of partial frame representing the respective sub-content units in order to efficiently use resources of the contents-displaying apparatus 100. To this end, the controller 150 generates such a moving thumb nail file by extracting frames which constitute partial replay time of each sub-content unit which have been generated by dividing one original content unit.

For example, in case ten 10-minute sub-content units are extracted from 100 minute original content units, the controller 150 can generate a 10-minute moving thumb nail file by extracting frames for the first one minute of each sub-content units. The file size of each moving thumb nail file is only ⅒ of that of the sub-content units, and thus the load to the system is much smaller than replaying the entire sub-content units during a replay of each thumb nail file.

Figure 2:
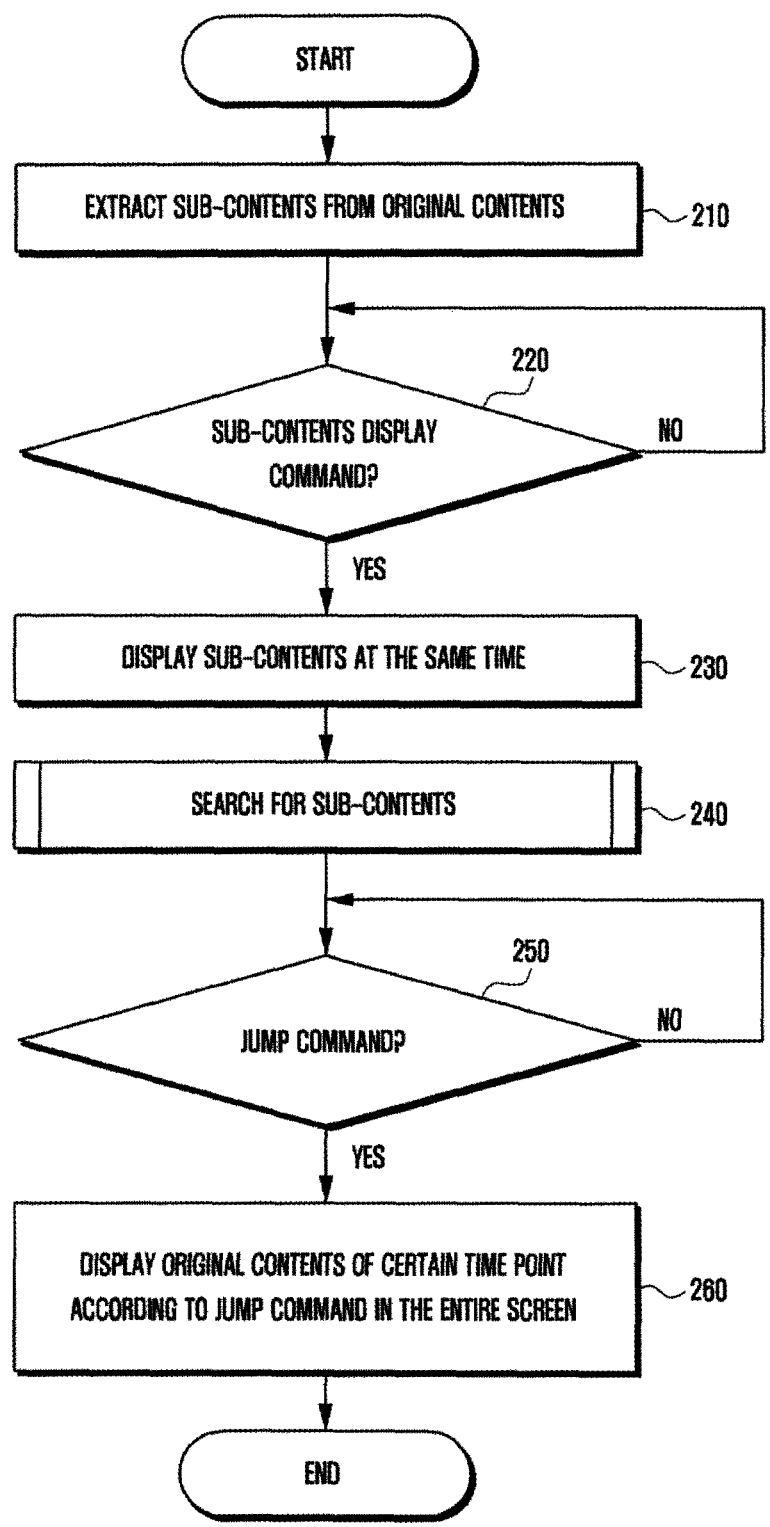
FIG. 2 is a flowchart illustrating a process of dividing and displaying original content units, and moving to a certain replay point according to an exemplary embodiment of the present invention.

FIG. 2 is a flowchart illustrating a process of dividing and displaying original content units, and moving to a certain replay point according to an exemplary embodiment of the present invention.

First, the controller 150 of the contents-displaying apparatus 100 extracts sub-content units from the original content units (210). The sub-content unit is extracted by dividing the original content units by a preset time interval. Further, as explained above, in an exemplary embodiment of the present invention, the controller 150 can allow user to select the number of sub-content units to be extracted from one original content unit. Such a sub-content units extraction step can also be performed after step 220 only if performed before step 230.

Next, the controller 150 of the contents-displaying apparatus 100 checks whether a user input received by the input unit 120 is a sub-content units display command (220). Such a sub-content units display command can be set as a touch input continued for a certain period of time while the original content units is being replayed on the screen. In case a sub-content units display command is received, the controller controls the display unit 146 to display a plurality of sub-content units at the same time (230).

Figure 3:
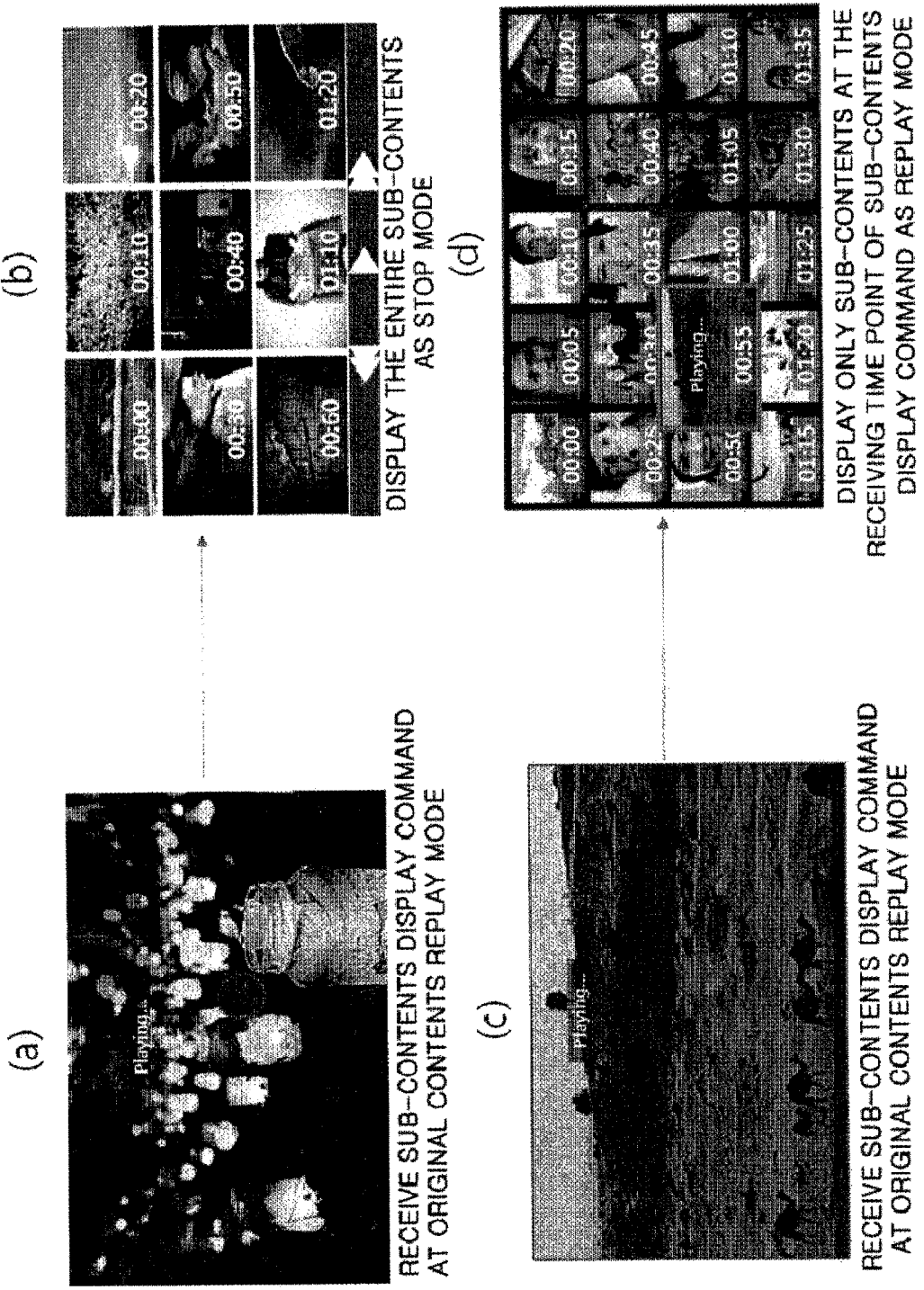
FIG. 3 specifically illustrates a graphic interface of step 230 of FIG. 2 which simultaneously displays sub-content units.

An example of a specific graphic interface, which receives a sub-content units display command and displays simultaneously sub-content units, is illustrated in FIG. 3.

As illustrated in FIGS. 3A and 3C, the sub-content units display command can be illustrated as a touch input continued for a certain period of time when the original content units display screen is shown. As illustrated in FIGS. 3B and 3D, if the sub-content units display command is received via the touch gesture, the screen is converted from the original content units display screen to the sub-content units display screen.

FIG. 3B illustrates a case where 9 sub-content units are extracted from one original content unit, and displays the entire 9 sub-content units as a stop mode.

Further, FIG. 3D illustrates a case where 20 sub-content units are extracted from one original content unit. Further, sub-content units including the receiving time point of the sub-content units display command, i.e., a $12^{th}$ sub-content unit is displayed as a replay mode, and the other sub-content units are displayed as a stop mode.

Referring to back to FIG. 2, the controller 150 checks whether a user input received by the input unit 120 is a search command for the sub-content units, and if so, the controller 150 controls the display unit 146 to display a screen having menu options to execute the search command (240). Such a search command may be one of a command for rewinding, fast-forwarding, playing or pausing for the entire or partial sub-content units, and a specific operation for executing the command is illustrated in details with reference to FIG. 4.

Figure 4:
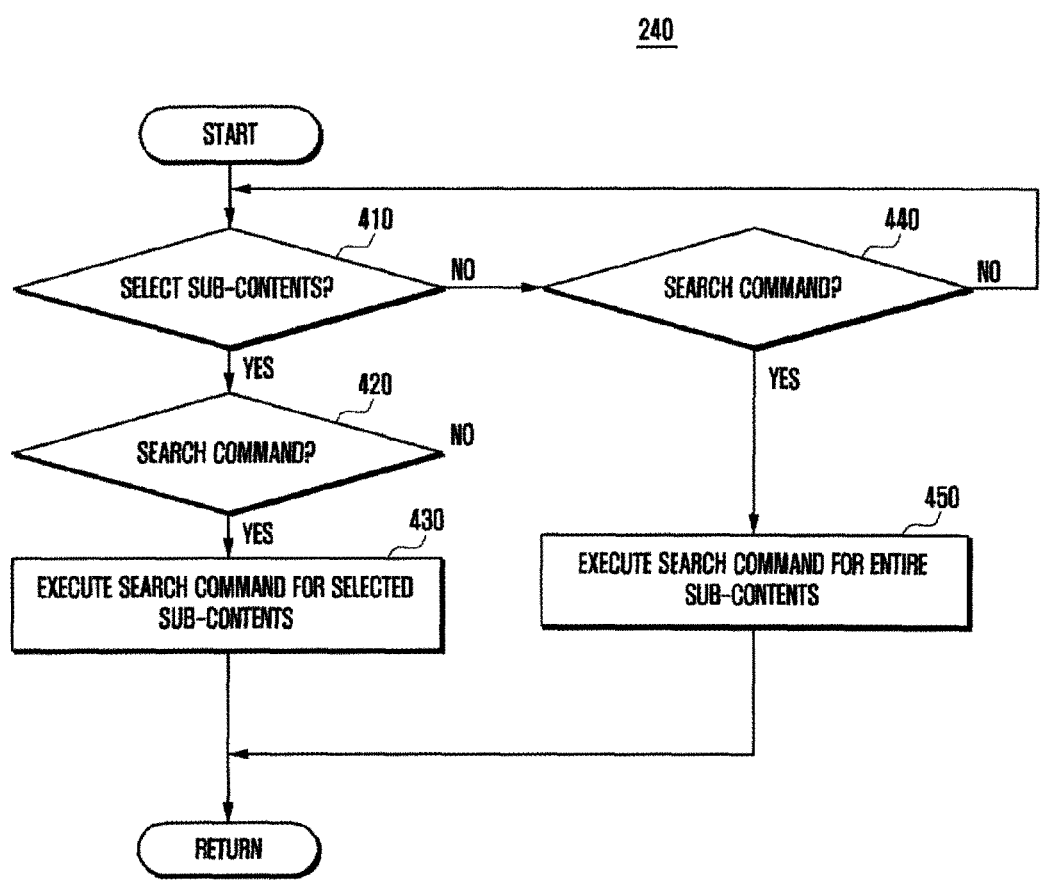
FIG. 4 is a flowchart illustrating a specific process of performing step 240 of FIG. 2 which searches for sub-content units.

FIG. 4 is a flowchart illustrating a specific process of performing step 240 of FIG. 2.

User selects a sub-content unit (410), and in response to a search command the user requested (420), the controller 150 executes a search command for the sub-content units selected by user (430). This is a case where a search command is executed for only part of the sub-content units. In case user does not select sub-content units at step 410 and requests a search command (440), the controller 150 executes a search command for the entire sub-content units (450).

FIGS. 5-8 illustrate an example of receiving a search command and executing the command.

Figure 5:
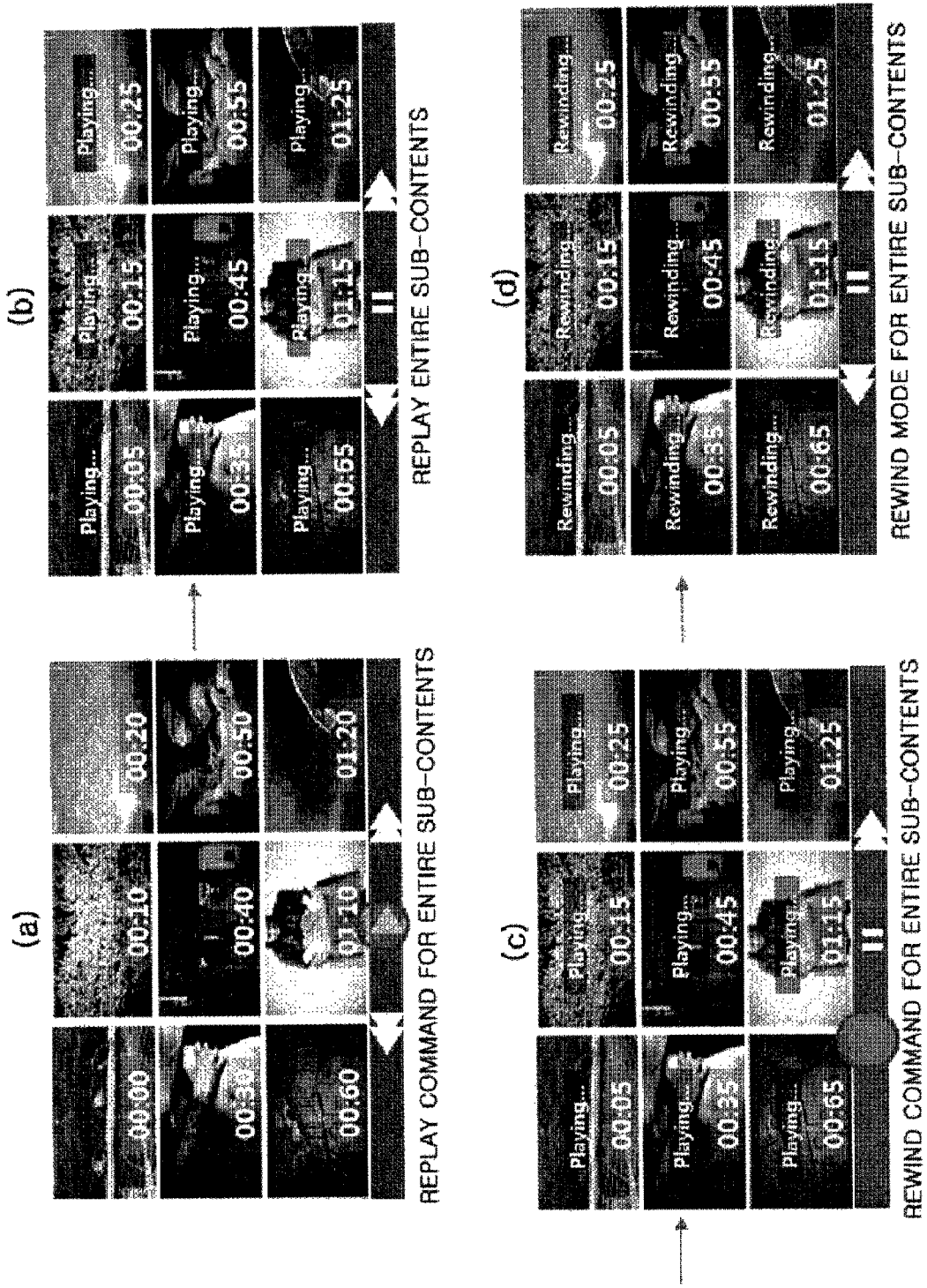
FIG. 5 illustrates a search command for the entire sub-content units.

FIG. 5 illustrates execution of a search command for the entire sub-content units. As illustrated in FIG. 5A, if user does not select a specific sub-content unit and inputs a replay icon by a touch, the entire sub-content units are replayed together simultaneously as in FIG. 5B. Similarly, as illustrated in FIG. 5C, if user touch-inputs a rewinding icon via a second search command thereafter, the entire sub-content units are rewound as in FIG. 5D.

Figure 6:
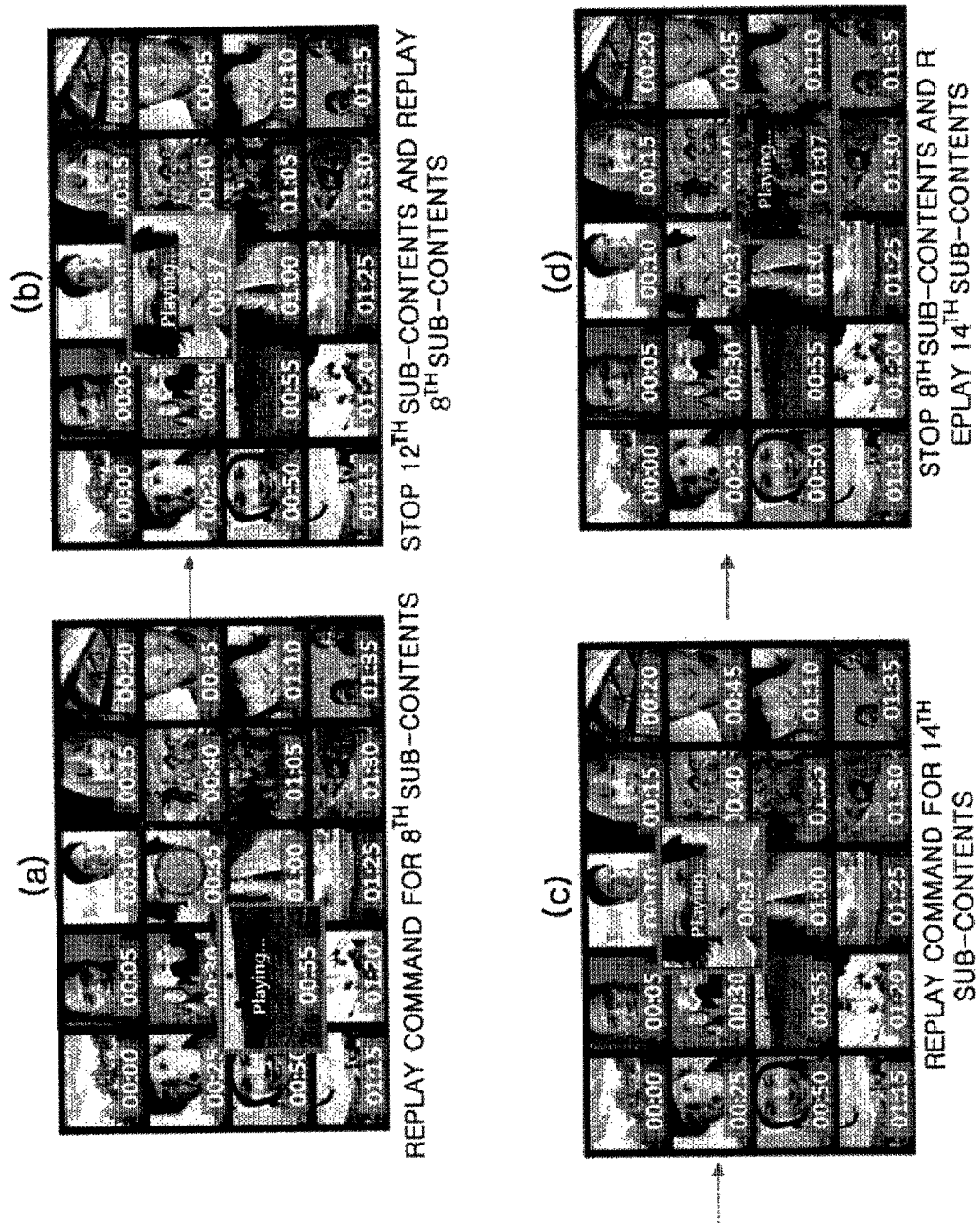
FIG. 6 illustrates executing a search command for only selected sub-content units.

FIG. 6 illustrates execution of a search command for part of the sub-content units, and a case where a touch input for sub-content units is set as a search command for replaying the sub-content units. As illustrated in FIG. 6A, if user touch-inputs an $8^{th}$ sub-content unit while the $12^{th}$ sub-content unit is being replayed, the $12^{th}$ sub-content unit is stopped, and the $8^{th}$ sub-content unit is replayed as shown in FIG. 6B.

Thereafter, as illustrated in FIG. 6C, if user touch-inputs a $14^{th}$ sub-content unit by a second search command, the $8^{th}$ sub-content unit stops and the $14^{th}$ sub content unit is replayed.

Figure 7:
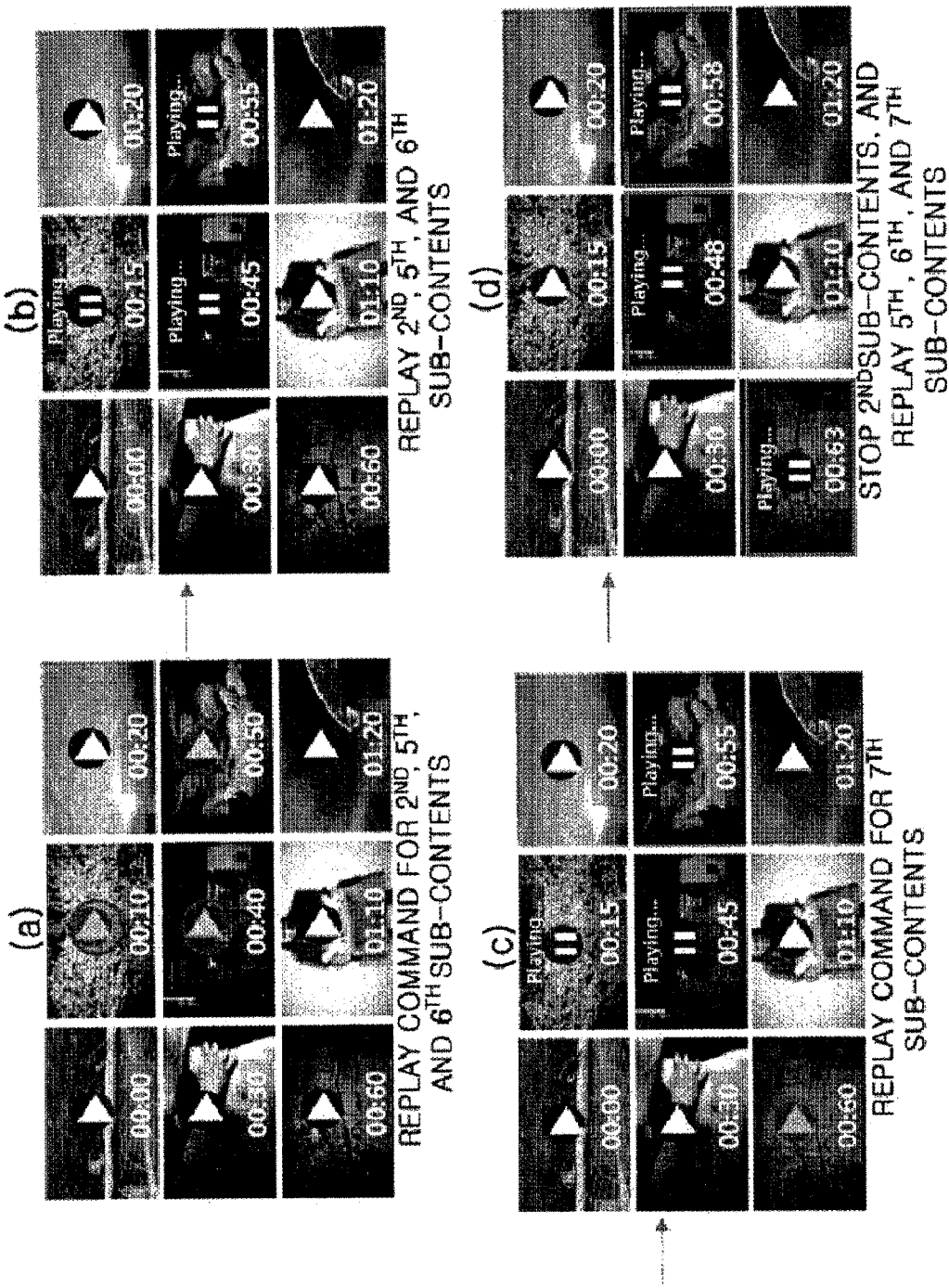
FIG. 7 illustrates executing a search command in case the number of renewable numbers is preset to three.

FIG. 7 illustrates execution of a search command in case the number of sub-content units, which can be displayed as a replay mode, is preset. This is for efficiently using resources of the contents-displaying apparatus 100, and FIG. 7 illustrates a case where the number of sub-content units, which can be displayed as a replay mode, is preset to three.

As illustrated in FIG. 7A, if user touch-inputs the sub-content units in the order of a $2^{nd}$, $5^{th}$, and $6^{th}$ sub-content units, the $2^{nd}$, $5^{th}$, and $6^{th}$ sub-content units are displayed as a replay mode as in FIG. 7B. Thereafter, if user touch-inputs a $7^{th}$ sub-content unit as in FIG. 7C, the second sub-content unit, which receives a replay command at first out of $2^{nd}$, $5^{th}$, and $6^{th}$ in the previous window from FIG. 7A stops, as in FIG. 7D, and the $5^{th}$, $6^{th}$, and $7^{th}$ sub-content units are displayed as a replay mode.

Figure 8:
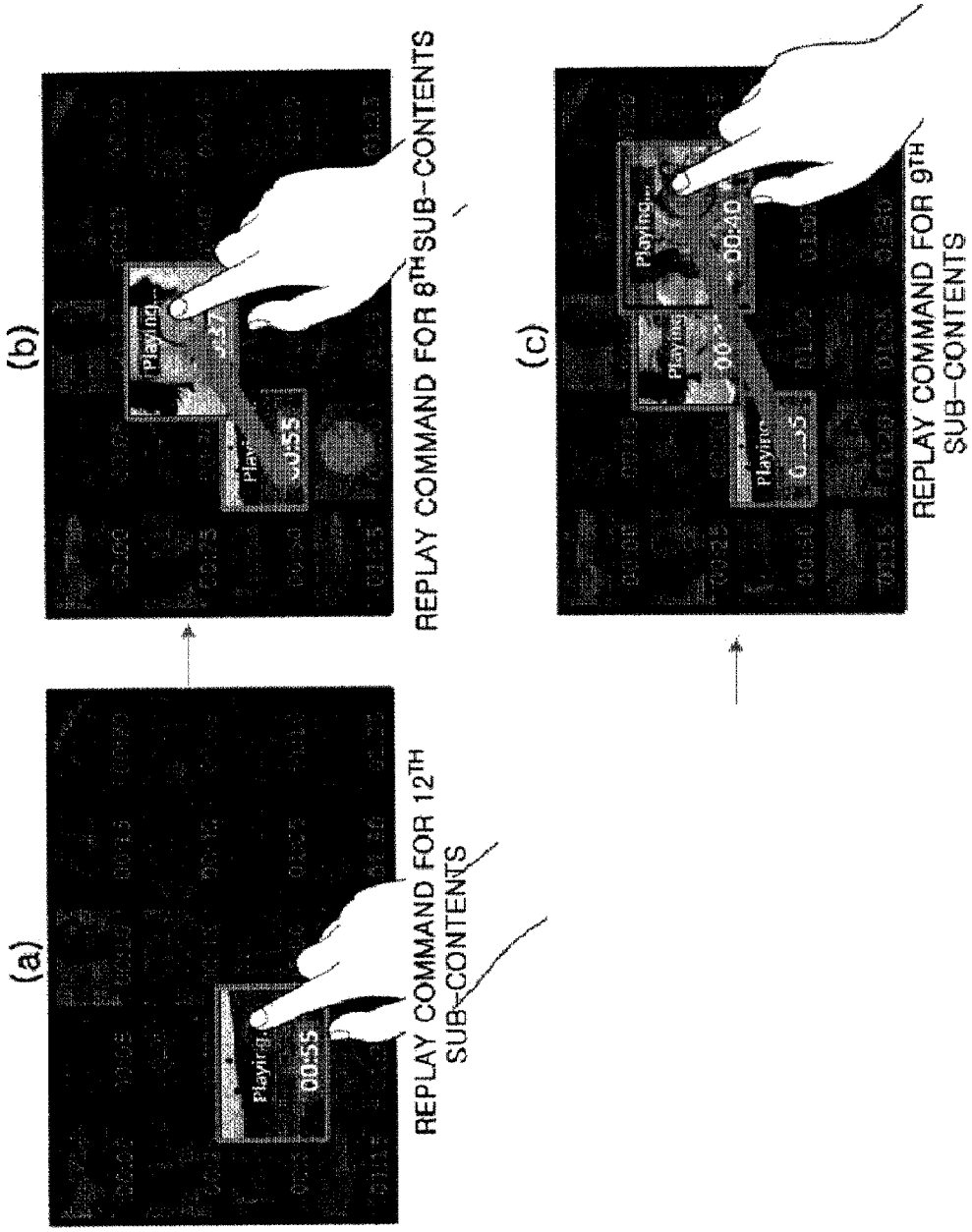
FIG. 8 illustrates another example of a gesture that implements a search command.

FIG. 8 illustrates another example of a gesture that implements a search command. The search command can be set as a drag input followed by a touch input as in FIG. 8. Such a gesture can be set as a search command for smooth conversion between stop mode and replay mode.

In case user touch-inputs a $12^{th}$ sub-content unit as in FIG. 8A, and continually makes a drag input toward a $8^{th}$ sub-content unit as in FIG. 8B, the replay mode of the $12^{th}$ sub-content unit gradually gets slow, and is eventually changed to stop mode, and the $8^{th}$ sub-content unit at stop mode is activated gradually or automatically changed to a play mode eventually and is displayed as a replay mode.

In case the $12^{th}$ sub-content unit is touch-inputted and continually makes a drag input toward the $9^{th}$ sub-content unit from the $12^{th}$ sub-content unit as shown by the arrow, the replay mode of the $8^{th}$ sub-content unit gets slow and then gradually changed to stop mode, while the $12^{th}$ sub-content unit at the stop mode is activated gradually and gradually changed to a play mode as a replay mode.

Referring to back to FIG. 2, the controller 150 checks whether a user input received by the input unit 120 is a jump command that selects a replay time point (250). If the input is a jump command, the controller 150 controls the display unit 146 to display the original content units in the entire screen (260).

The jump command can be illustrated as a touch input continued for a certain period of time in a particular sub-content unit. If such a jump command is received, the controller 150 converts the selected sub-content unit display screen into the original content units display screen. Further, the original content units are displayed from the replay time point selected from the jump content unit.

FIG. 9 illustrates a graphic interface which receives a jump command. As illustrated in FIG. 9, a jump command can be illustrated as a touch input continued for a certain period of time for a particular sub-content unit.

Figure 9A:
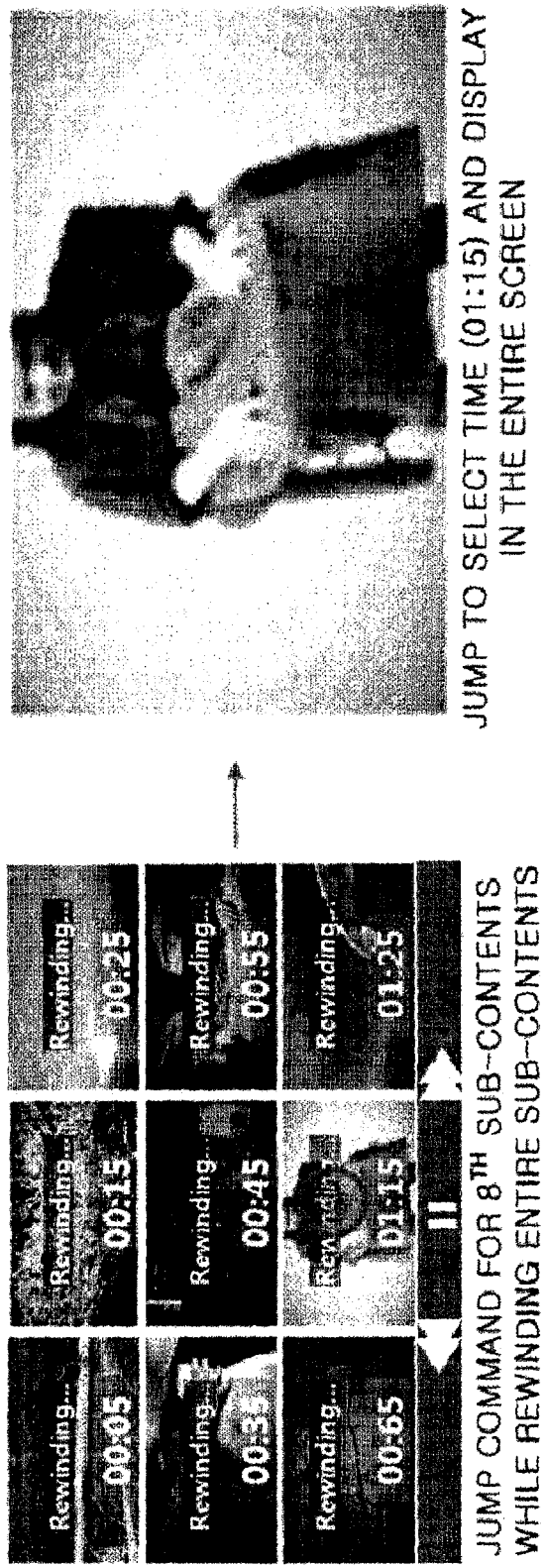
FIG. 9A and FIG. 9B illustrate a graphic interface that receives a jump command.

FIG. 9A is a case where a jump command is received for the sub-content units of the rewinding mode, and specifically a case where a touch input continued for a certain period of time for the $8^{th}$ sub-content unit of replay time 01:15 is received. In such a case, the sub-content units display screen is revert back the original content units display screen, and the original content units is display from replay time 01:15 as in FIG. 9A. Note that the jump command can in other modes other than the rewinding mode, for example in a playing mode.

Figure 9B:
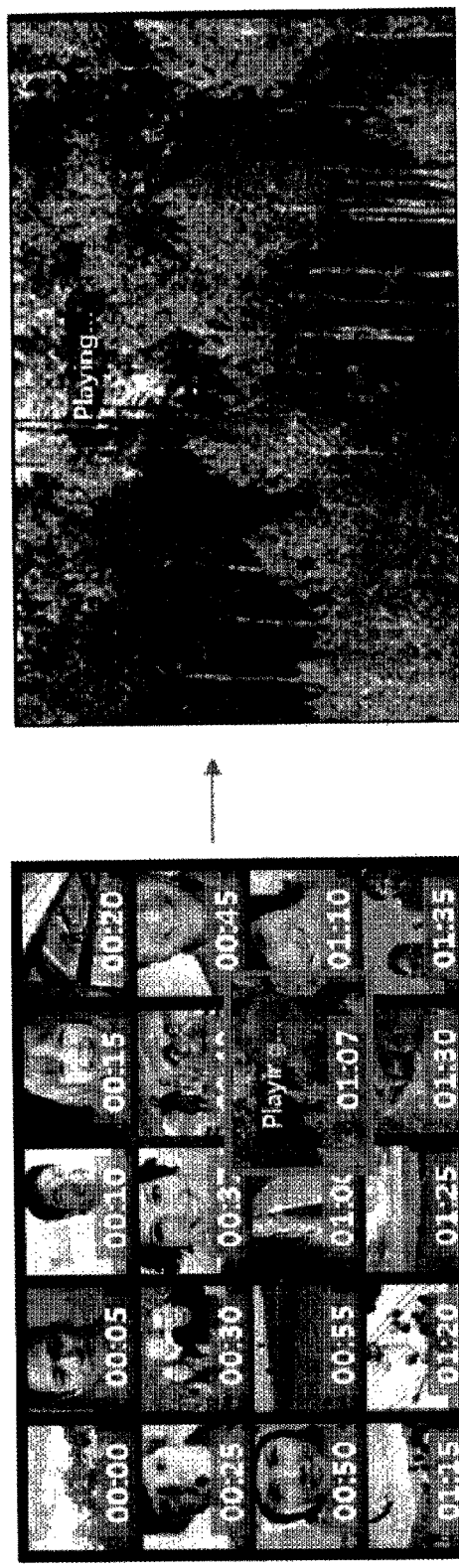

FIG. 9B is a case where a jump command is received for the sub-content units of the replay mode, and specifically a case where a touch input is received continuously for a certain period of time for the $14^{th}$ sub-content unit of replay time 01:07. In such a case, the sub-content units display screen is converted into the original content units display screen displaying only the $14^{th}$ sub content unit showing the replay time of 01:07 as in FIG. 9B.

Further, the example of FIG. 9 is for displaying sub-content units, thus in an alternate embodiment, the sub content units can also be utilized as an interface for displaying a multiple of broadcast channels and changes the channel. For example, as in FIG. 9A, 9 broadcast channels can be displayed in one screen during operation, and if user selects the $8^{th}$ channel, the content of the $8^{th}$ channel can be only displayed in a single screen.

FIG. 10 is a flowchart illustrating a process of extracting a moving thumbnail that represents sub-content units, and executing a search command and a jump command according to another exemplary embodiment of the present invention.

Figure 11:
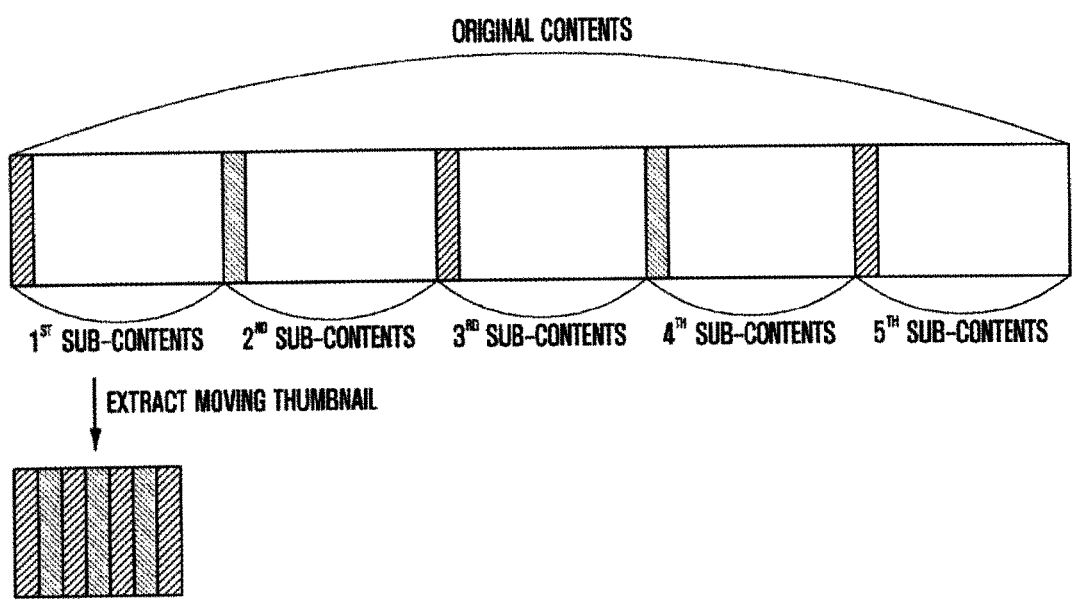
FIG. 11 illustrates a data structure of sub-content units and a moving thumbnail.

FIG. 11 illustrates a data structure of the sub-content units and the moving thumbnail file.

As illustrated in FIG. 11, the entire replay time of the original content units can be extracted as 5 parts, for example, and 5 sub-content units can be extracted.

Referring to FIGS. 10 and 11, a moving thumbnail file is separately generated to efficiently use resources of the contents-displaying apparatus 100. As shown, the size of the moving thumbnail file is much smaller than that of the sub-content units extracted after dividing the original content units, and thus much less resources are used for processing. That is, the controller 150 extracts frames which constitute partial replay time of each sub-content units generated by dividing one original content units (710). For example, only frames which constitute only first 10 seconds of 10 min. sub-content units are extracted. The size of such a moving thumbnail file is only ⅟₆₀ compared with that of the sub-content units, and thus the load is much less compared to replaying the entire sub-contents in the display apparatus 100.

Further, the controller 150 generates the address of the original content units where the frame was originally positioned, and a matching table listing where each frame is stored connects each frame (720) and generates a moving thumbnail file (730).

If the controller 150 receives a sub-content units display command (740), and the controller 150 displays a moving thumbnail which shows a sub-content unit (750). For example, the graphic interface of a moving thumbnail can be the same display as that of FIG. 3A and FIG. 3B, except that the moving thumbnail has a much short replay time because only the first parts of the sub-content units have been cut.

If the controller 150 receives a search command for a moving thumbnail (760), the controller 150 controls the display unit 146 to display a screen which executes a search command (770). The graphic interface, which executes a search command of the moving thumbnail, can be similar or same as that of FIGS. 5 to 8, except the replay time would be much short when selecting a particular sub content unit via the moving thumbnail file.

If the controller 150 receives a jump command for a particular moving thumbnail (780), the controller 150 checks the matching table (790). This is for checking the replay time point of the original content unit for the corresponding to the selected moving thumbnail.

Thereafter, the controller 150 converts the whole moving thumbnail display screen into the original content units display screen (795) replay the original content units from the above checked replay time point retrieved from the matching table.

According to the present invention, a plurality of sub-content units, which have been generated by dividing the original content units by a preset time interval for classification for later scene selection, are simultaneously displayed, and thus user can easily search for a desired scene without searching the entire original content units.

In addition, according to an exemplary embodiment of the present invention, a moving thumbnail file, which represents the sub-content units, can be generated, and thus the resource of the content units display apparatus can be efficiently used by reducing the length of sub-content units during classification.

The above described methods according to the present invention can be implemented in hardware, firmware or as software of computer code that can be stored in a recording medium such as a CD ROM, a RAM, a floppy disk, a hard disk, or a magneto-optical disc or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for dividing and displaying contents of a media file, comprising:
   playing an original content of the media file;
   displaying a plurality of sub content units by dividing the original content by a preset time interval on a display when receiving a user input;
   playing a sub content including a receiving time point of the user input
   receiving a search command to rewind, fast-forward, play or pause without selection of a particular sub content media unit from the displayed plurality of sub content units; and
   executing the search command simultaneously on all displayed plurality of sub content media units.

2. The method of claim 1, wherein playing a sub content including the receiving time point of the user input further comprises:
   displaying a sub content not including the receiving time point of the user input in a stopped mode.

3. The method of claim 2, wherein displaying the plurality of sub content media units further comprises:
   displaying a content of each sub content media unit at a starting time point of each sub content media unit.

4. The method of claim 1, further comprising:
   receiving a selection of one particular sub content media unit from the displayed plurality of sub content media units;
   determining a replay time point of the media file associated with the selected sub content media unit; and
   playing the media file from the replay time point.

5. The method of claim 1,
   wherein the search command is received without selection of a particular sub content media unit from the displayed plurality of sub content media units.

6. A method for dividing and displaying contents of a media file, comprising:
   playing an original content of the media file;
   displaying a plurality of sub content units by dividing the original content by a preset time interval on a display when receiving a user input;
   receiving a selection of at least one sub content media unit;
   receiving a search command to rewind, fast-forward, play or pause; and
   playing the at least one selected sub content media unit according to the search command, wherein unselected sub content media units continue to be displayed in a stopped mode.

7. The method of claim 6, further comprising:
   extracting frames that constitute a partial range of content of each sub content media unit,
   generating an animated thumbnail file of the sub content media unit based on the partial range of content; and
   displaying the animated thumbnail file to represent the sub content media unit.

8. An apparatus for dividing and displaying contents of a media file, comprising:
   a display unit; and
   a controller unit configured to:
      play an original content of the media file on the display unit,
      display the plurality of sub content units by dividing the original content by a preset time interval on a display when receiving a user input on the display unit,
      play a sub content including a receiving time point of the user input on the display unit, and
      receive a search command to rewind, fast-forward, play or pause and execute the search command simultaneously on all the displayed plurality of sub content units.

9. The apparatus of claim 8, wherein the controller unit is configured to display a sub content not including the receiving time point of the user input in a stopped mode on the display unit.

10. The apparatus of claim 9, wherein the controller unit is configured to display a content of each sub content media unit at a starting time point of each sub content media unit on the display unit.

11. The apparatus of claim 8, wherein the controller is configured to:
   receive a selection of one particular sub content media unit from the displayed plurality of sub content units, and
   determine a replay time point of the media file associated with the selected sub content media unit, and
   play the media file from the replay time point.

12. The apparatus of claim 8, wherein
   the search command is received without selection of a particular sub content media unit from the displayed plurality of sub content units.

13. An apparatus for dividing and displaying contents of a media file, comprising:
   a display unit; and
   a controller unit configured to:
      play an original content of the media file;
      display the plurality of sub content units by dividing the original content by a preset time interval on a display when receiving a user input;
      receive a selection of at least one sub content media unit;
      receive a search command to rewind, fast-forward, play or pause; and
      playing the at least one selected sub content media unit according to the search command, wherein unselected sub content media units continue to be displayed in a stopped mode.

14. The apparatus of claim 8, wherein the controller is configured to:
   extract frames that constitute a partial range of content of each sub content media unit,
   generate an animated thumbnail file of the sub content media unit based on the partial range of content, and
   display the animated thumbnail file to represent the sub content media unit.

* * * * *